Patented Nov. 10, 1953

2,658,349

UNITED STATES PATENT OFFICE 2,658,349

PLANT FOR THE RECOVERY OF WASTE HEAT FROM COMBUSTIBLE GASES DERIVED FROM CHEMICAL PROCESSES

Curt Keller, Kusnacht, Switzerland, assignor to Aktiengesellschaft Fuer Technische Studien, Zurich, Switzerland, a corporation of Switzerland Application December 19, 1949, Serial No. 133,766

Claims priority, application Switzerland January 21, 1949

7 Claims. (Cl. 60—59)

In many industrial works, combustible gases are produced as main products or by-products, such gases frequently being yielded at relatively high temperature. Gases of this kind are generally cooled during their further conveyance, and in some cases also for the purpose of purification without there being any possibility of utilising their sensible heat.

The invention relates to a plant for the utilisation of the sensible heat contained in combustible gases produced by gas producers, chemical installations and the like.

The object of the invention is to render possible the utilisation of such sensible heat in gas turbine plants of the type in which the working medium works in a closed circuit and is heated indirectly, that is to say, by heat supplied through walls. In a plant of this type, in accordance with the invention, at least a part of the combustible gases yielded gives up sensible heat in a surface heat exchanger to at least a part of the medium working in the closed circuit. To the latter medium there is then supplied at another point of its path in a surface heater, in which a portion of the gases yielded is burnt, a further quantity of heat, preferably the quantity of heat which is still required to bring the medium working in the closed circuit to a predetermined temperature before it reaches the turbine.

Figure 1:
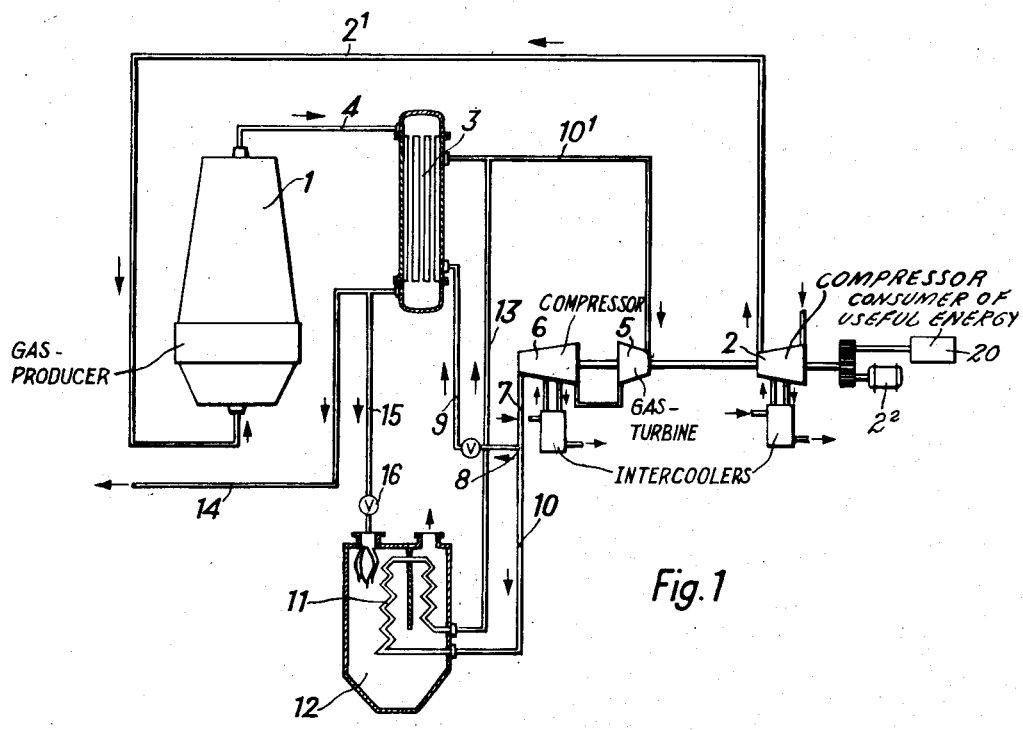
Figure 2:
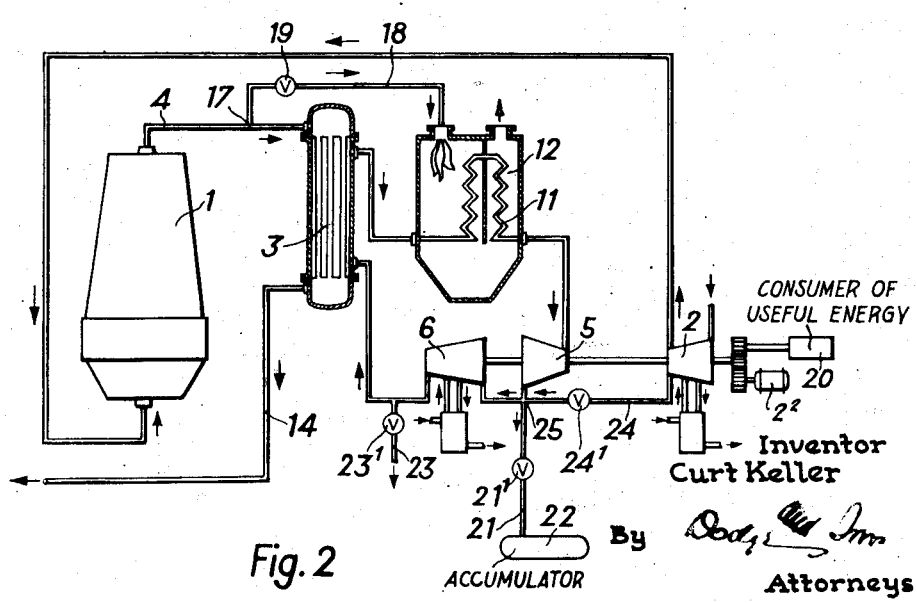

Two embodiments of the subject of the invention are illustrated in simplified form by way of example in the accompanying drawing, in which:

Figure 1 shows a plant in which the combustible gases yielded all pass through a surface heat exchanger, while only a part of the medium working in a closed circuit passes through this preheater, and Figure 2 shows a plant in which the flow conditions in regard to the surface heat exchanger are precisely the reverse of those in the plant shown in Figure 1.

In Figure 1, 1 is a supercharged gas producer, that is to say a producer in the gasification shaft of which the gas production takes place under a pressure higher than atmospheric pressure. The air required for the gas production is supplied to the producer 1 by a compressor 2, which sucks it from the surrounding atmosphere and conveys it into a pipe $2^1$ connected to the producer 1. At 3 is shown a surface heat exchanger into which all the combustible gases produced in the gas producer 1 pass through a pipe 4. The turbine 5 is part of a gas turbine plant in which the working medium passes through a closed circuit. The said plant also comprises a compressor 6 which again brings the gas expanded in the turbine 5 to a higher pressure and then conveys it into a pipe 7. The said pipe 7 is divided at the point 8 into two branches 9 and 10. The branch 9 is connected to the heat exchanger 3, and that part of the medium working in the closed circuit which passes into the said heat exchanger through the branch 9 absorbs in the heat exchanger 3 heat from the hot gases yielded by the gas producer 1 which flow through the said heat exchanger, and passes after thus having been heated into a pipe $10^1$ connected to the inlet portion of the turbine 5.

The aforesaid pipe branch 10 is connected to the heating system 11 of a surface heater 12. A pipe 13 is provided to afford communication between the heating system 11 and the pipe $10^1$ already mentioned. The component currents flowing through the heating system 11 and the surface heat exchanger 3, of the medium working in the closed circuit are consequently flowing in parallel relation. In the surface heater 12, a part of the combustible producer gases leaving the heat exchanger 3 is burnt in order that a further quantity of heat may be supplied to the medium working in the closed circuit at this point of the path traversed by the said medium. This further quantity of heat will preferably correspond to the quantity of heat still required to bring the medium in question to a predeterminated temperature before it reaches the turbine 5. The remaining part of the yielded gas leaving the surface heat exchanger 3 flows through a pipe 14 to a point of consumption not shown. A starting motor is indicated at $2^2$.

The turbine 5 drives the compressor 2, which conveys the air required for charging the gas producer 1 and for the gasification. This imposes a load external to the power plant circuit. An additional external load such as that indicated at 20 can be imposed. In the plant described, therefore, sensible heat contained in the combustible gases produced by the gas producer 1 is utilised for the generation of mechanical energy. In order to render possible adaption to any variation in the power requirement of the enery consumer 2 driven by the turbine 5, a regulating member 16 is provided in the pipe 15 through which yielded producer gases flow to the surface heater 12, so that that portion of yielded combustible gases which passes into the surface heater 12 may be adapted to the said power requirement and the degree of heating of that portion of the medium working in the closed circuit which flows through the heating system 11 may consequently be controlled.

In the described plant, the utilisation of the sensible heat of yielded combustible gases in a gas turbine is possible even if the said gases contain a large amount of impurities, which would not be possible if the plant comprised a so-called "open" gas turbine in which driving gases produced with the aid of the said yielded gases had to be dealt with. This is connected with the fact that in a plant according to the invention the contaminated combustible gases in the surface heat exchanger 3 come into contact with only the outer surface of heat-exchange tubes which can be cleaned relatively easy, whereas in the case of open gas turbines the contaminated driving gases come into direct contact with the blading of the turbine, so that its efficiency is rapidly impaired.

In the plant shown in Figure 2, the parts corresponding to those of Figure 1 bear the same reference numerals. In this second embodiment, all the medium working in a closed circuit flows through the surface heat exchanger 3 and, after having absorbed heat therein, is further heated in the heating system 11 of the surface heater 12 in order that it may have a predetermined temperature at the inlet into the turbine 5. The gases flowing away from the gas producer 1 only partly flow through the surface heat exchanger 3, a portion of these yielded gases branching off from the pipe 4 at the point 17 and being passed through a pipe 18 into the combustion chamber of the surface heater 12. An adjustment valve 19 provided in the branch pipe 18 enables the quantity of yielded combustible gases passing into the surface heater 12 to be varied and consequently allows of adapting the heat supplied in the heating system 11 to the medium working in the closed circuit to the energy consumed by the compressor 2 in each case.

In Figure 2, a further consumer of useful energy 20 driven by the turbne 5 and a working medium accumulator 22 connected to the closed circuit through a pipe 21, adapted to be cut off by means of an adjustment valve 21¹, are also shown. The reference character 2² denotes a starting motor in this figure also and 23 is a pipe adapted to be cut off by means of an adjustment valve 23¹; this pipe 23 allows, when the valve 23¹ is in the open position, an escape of medium from the circuit. According to the magnitude of the energy supply required by the energy-consumers 2 and 20, the pressure level in the closed circuit is varied by the admission of working medium from the accumulator 22 or by the discharge of working medium through the pipe 23. At the same time, it is possible with the aid of the adjustment valve 19 to adapt the quantity of yielded combustible gases flowing to the surface heater 12 to the energy to be delivered by the turbine 5 in each case, so that the medium working in the closed circuit may be brought to the temperature required at the inlet into the turbine 5 at all loads of the plant.

The pressure level in the circuit can also be varied by tapping off additional working medium from the compressor 2 through a pipe 24 adapted to be cut off by means of an adjustment valve 24¹, in the manner shown in Figure 2, and introducing it into the closed circuit at a point 25.

Since that part of the medium working in the closed circuit which flows through the surface heat exchanger 3 is under higher pressure (for example 15 atm.), favourable pressure conditions can be produced in this heat exchanger for the heat exchange and consequently also favourable dimensions from the economic viewpoint can be attained.

The medium working in the closed circuit may be air or another gas, such for example as helium, a mixture with helium as a base, hydrogen or nitrogen.

What is claimed is:

1. The combination of a source of hot fuel gases; a thermal power plant in which a gaseous working medium describes a closed path, said plant comprising means defining the closed circuit, the charge of working medium and the following components connected therein in the order stated, compressing means, dual heating means including a surface heat exchanger and a surface heater provided with combustion means and a turbine; a consumer of useful energy; connections whereby said turbine drives said compressing means and said consumer of useful energy; connections for passing at least a portion of said hot fuel gas through said surface heat exchanger to deliver heat to working medium in said circuit; and connections for delivering at least a portion of said fuel gas to the combustion means of said surface heater.

2. The combination defined in claim 1 in which the surface heat exchanger and the surface combustion heater are connected in series in that order as to the flow of working medium.

3. The combination defined in claim 1 in which the surface heat exchanger and the surface combustion heater are connected in series in that order as to the flow of working medium, and the portion of the fuel gas delivered to the combustion means of the combustion heater bypasses said surface heater.

4. The combination defined in claim 1 in which the surface heat exchanger and the surface combustion-heater are connected in parallel as to the flow of working medium.

5. The combination defined in claim 1 in which the surface heat exchanger and the surface combustion-heater are connected in parallel as to the flow of working medium, and the portion of fuel gas delivered to the combustion means of the combustion heater passes first through the surface heat exchanger.

6. The combination of a producer of hot combustible gas adapted to operate under pressure; a thermal power plant in which a gaseous working medium describes a closed path, said plant comprising means defining the closed circuit, the charge of working medium and the following components connected therein in the order stated, compressing means, dual heating means including a surface heat exchanger and a surface heater provided with combustion means, and a turbine; a supercharging compressor connected to supply air to said producer; connections whereby said turbine drives said compressing means and said supercharging compressor; connections for passing at least a portion of said hot fuel gas through said surface heat exchanger to deliver heat to working medium in said circuit; and connections for delivering at least a portion of said fuel gas to the combustion means of said surface heater.

7. The combination of a producer of hot combustible gas adapted to operate under pressure; a thermal power plant in which a gaseous working medium describes a closed path, said plant comprising means defining the closed circuit, the charge of working medium and the following components connected therein in the order stated, compressing means, dual heating means including a surface heat exchanger and a surface heater provided with combustion means, and a turbine; a supercharging compressor connected to supply air to said producer; connections whereby said turbine drives said compressing means and said supercharging compressor; connections for passing at least a portion of said hot fuel gas through said surface heat exchanger to deliver heat to working medium in said circuit; connections for delivering at least a portion of said fuel gas to the combustion means of said surface heater; and means whereby said turbine delivers power externally.

CURT KELLER.

References Cited in the file of this patent

UNITED STATES PATENTS

| Number | Name | Date |
|---|---|---|
| 1,813,543 | Pateras Pescara | July 7, 1931 |
| 2,203,731 | Keller | June 11, 1940 |
| 2,305,785 | Jendrassik | Dec. 22, 1942 |
| 2,471,755 | Karrer | May 31, 1949 |
| 2,513,601 | Traupel | July 4, 1950 |

FOREIGN PATENTS

| Number | Country | Date |
|---|---|---|
| 468,287 | Great Britain | July 1, 1937 |
| 546,275 | Great Britain | July 6, 1942 |
| 590,208 | Great Britain | July 10, 1947 |
| 602,573 | Great Britain | May 28, 1948 |
| 202,325 | Switzerland | May 16, 1939 |
| 215,485 | Switzerland | Oct. 1, 1941 |